United States Patent [19]

Lavoisey

[11] 4,189,818
[45] Feb. 26, 1980

[54] APPARATUS AND METHOD FOR THE ASSEMBLY OF GLASS SHEETS

[75] Inventor: Yves Lavoisey, Asnieres, France

[73] Assignee: Saint-Gobain Industries, Neuilly-sur-Seine, France

[21] Appl. No.: 850,355

[22] Filed: Nov. 10, 1977

[30] Foreign Application Priority Data

Nov. 15, 1976 [FR] France ............... 76 34284

[51] Int. Cl.² ............................................. B25B 27/14
[52] U.S. Cl. ................................................. 29/281.5
[58] Field of Search ................ 29/281.4, 281.5, 281.6, 29/455, 428; 214/7; 271/185

[56] References Cited

U.S. PATENT DOCUMENTS

| 3,391,805 | 7/1968 | Baden | 414/55 |
| 3,410,425 | 11/1968 | Guillaume | 214/7 |
| 3,774,783 | 11/1973 | Miller et al. | 214/7 |
| 3,934,871 | 1/1976 | Dean | 271/184 |
| 3,943,808 | 3/1976 | Pryor et al. | 83/88 |

Primary Examiner—James L. Jones, Jr.
Attorney, Agent, or Firm—Pennie & Edmonds

[57] ABSTRACT

An apparatus for assembly of transparent plate shaped objects to form a multiple, insulating window comprises individual support parts initially disposed at an angle of no more than 180° one relative to the other and each support part is adapted to receive one of the plate shaped objects to be assembled. At least one of the support parts is movable through an angle of rotation about a first axis located near the plate shaped object which it supports, and at least one of the support parts then is movable through a smaller angle of rotation about a second axis further removed from the plate shaped object which it supports. Both of the axes are parallel to each other and to the plane of each support part, and the second axis is at substantially the intersection of the planes including the faces of the confronting plate shaped objects after the first movement.

11 Claims, 12 Drawing Figures

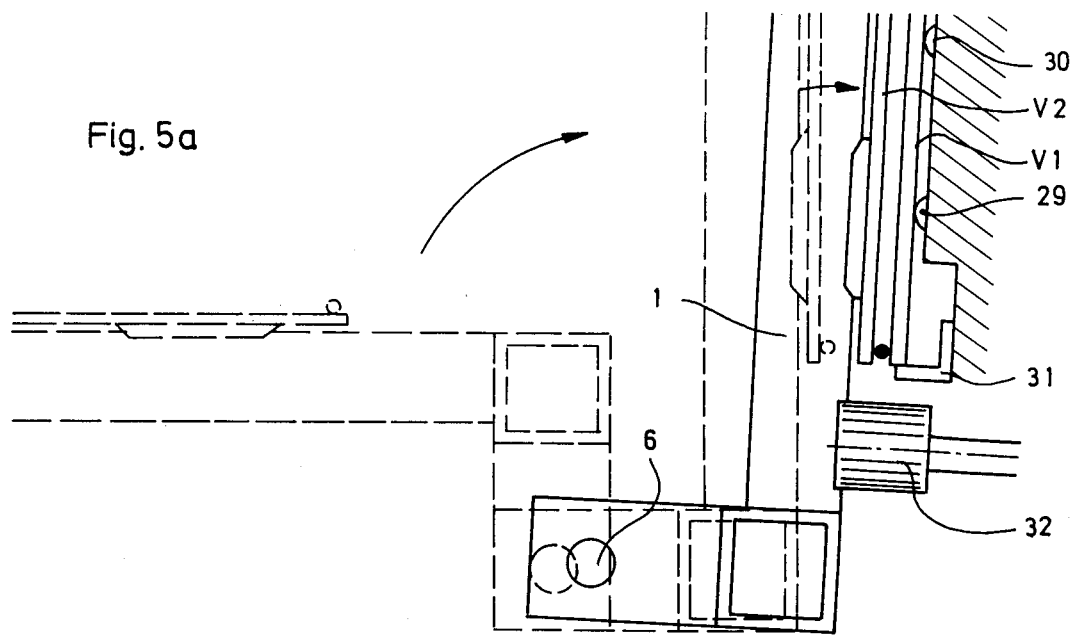
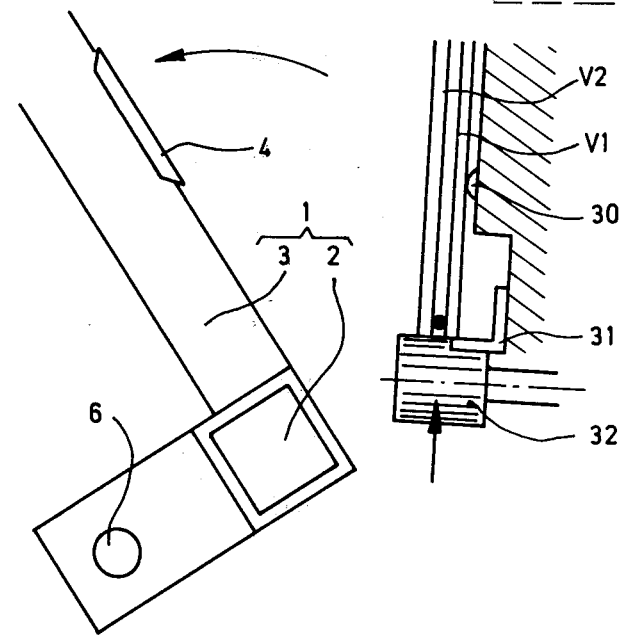
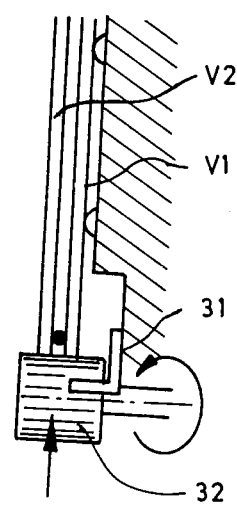
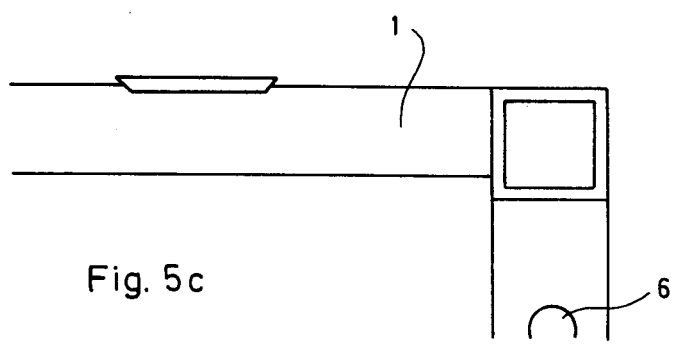
Fig. 5a
Fig. 5b
Fig. 5c

APPARATUS AND METHOD FOR THE ASSEMBLY OF GLASS SHEETS

BACKGROUND OF THE INVENTION

1. Field of the Invention

The present invention relates to an improved apparatus for use in the assembly of two or more plate shaped objects such as glass sheets to form a multiple, insulating window. The apparatus comprises a support part for each plate shaped object. Each support part initially is disposed at an angle one to another and adapted to receive one of the plate shaped objects to be assembled. At least one support part is capable of undergoing movement toward an assembly position through a rotational angle about an axis and, thereafter, at least one support part is capable of undergoing movement further toward the assembly position through a rotational angle, about a different axis. The latter axis is located from the support part by a greater distance than the former axis. The plate shaped objects, by virtue of a compound rotational movement, are located to the assembly position in substantial parallelism. While the invention will be described in the adaption of a pair of plate shaped objects being assembled and maintained together by an intercalated joint, it is pointed out and should be kept in mind as the specifics of the invention are set out hereafter that multiple, insulating windows comprised of more than two plate shaped objects may be assembled with equal facility.

2. Description of the Prior Art

Multiple, insulating windows comprised of two or more plate shaped objects spaced apart and maintained together by intercalated joints formed of plastic materials are well known in the art. In the assembly of insulating windows of this type, a collar, which ultimately forms a part of an intercalated joint, first is deposited on one plate shaped object and then that plate shaped object is reoriented so that the face carrying the collar is situated in close juxtaposition to a face of the other plate shaped object. The two plate shaped objects then are pressed together in order that the assembly achieve a final required thickness. Thereafter, a second plastic material is deposited around the edges of the assembly outwardly of the collar and substantially between the plate shaped objects.

French Pat. No. 2,211,413 describes apparatus for the production of insulating windows, particularly a double insulating window, whereby a pair of glass sheets both moving in a flat or horizontal disposition are assembled, likewise, in a flat or horizontal position. A collar provides for both spacing and sealing. In assembly, one of the glass sheets is reversed in orientation and located to a position so that one of its faces is juxtaposed to a face of the other glass sheet. The apparatus for this purpose comprises a structure for supporting and then gripping the first-mentioned glass sheet in movement. Movement in the reversal of orientation is about a pivot axis. At the moment of assembly, i.e., when the collar on one sheet contacts a face of the other glass sheet or vice versa, it is necessary for the two glass sheets to be substantially in parallel alignment in order to obviate an inclination and a crushing of the collar within proximity of the pivot axis to a greater degree than portions of the collar further removed from the pivot axis. The inclination and the effect of non-uniformity in crushing of the collar, more pronounced with collars of greater cross section, results in a diminution in the integrity and tightness of the seal and maintenance of a captive volume of air between the two glass sheets.

In order to avoid this problem in the assembly of glass sheets in the horizontal position, it has been proposed that the glass sheet to be reversed in orientation, as set out above, be supported and gripped by structure which maintains the position of the glass sheet at a greater distance from the pivot axis. Thus, each point within the glass sheet which is subject to being reversed in orientation moves along an arc of greater radius and the cross section of the collar becomes less and less a factor as the radius of the arc of movement is increased. To this end, the planes of the confronting faces of the glass sheets at the assembly position will approach parallelism as the arc of movement is increased.

If, for considerations of space, the two glass sheets to be assembled are conveyed to the support structure, one in an approximately vertical disposition and the other in a flat or horizontal disposition, the same problem exists unless the glass sheet carrying the collar is caused to move from the horizontal disposition along an arc of similarly great radius. If not, the collar will be crushed in a non-uniform manner, as before, likewise because of a failure in achieving substantial parallelism of the glass sheets upon assembly. Of course, the assembly of the two glass sheets could be carried out at a location further removed from the pivot axis and well above the normal working height, but the requirement of space again is prevalent and importantly assembly of the two glass sheets will take place outside of the region within which the quality of the fabricated multiple, insulating window may be verified.

SUMMARY OF THE INVENTION

It is an important aspect of the present invention to provide apparatus for and a method of assembly of plate shaped objects, such as glass sheets, at normal working heights, without the requirement of substantial space considerations, and in a manner whereby the glass sheets to be assembled arrive at the point of assembly in substantial parallelism thereby to overcome the above problem and disadvantage, among possible others, noted in the art.

The method according to an important aspect of the invention, providing for the assembly of two glass sheets, initially located in different planes broadly comprises the steps of positioning each glass sheet in a plane, setting the individual glass sheets in that plane, relocating at least one of the two glass sheets toward the other glass sheet and an assembly point first by pivoting the same around an axis located near the glass sheet supported by the pivoting plane, and then relocating at least one of the two glass sheets to a position of face-to-face juxtaposition with the other glass sheet by pivoting the same around at least one other axis parallel to the first-mentioned axis but distant from the glass sheet carried by the pivoting plane.

The apparatus for carrying out the method according to the invention comprises a support part for each of the glass sheets, means for imparting movement to at least one of the support parts around a pivot axis located near the glass sheet which it supports as well as parallel to the planes of the support parts, and means for imparting movement to at least one of the support parts around at least one other pivot axis which is parallel to the first axis. The first movement is through a first rotational angle, while the second movement is through a second and much smaller angle.

According to an additional feature of the invention, the pivot axis around which the second movement is carried out is located at a greater distance from the support parts and, further, at the intersection of the planes including the faces of the glass sheets upon termination of the first movement.

According to a preferred embodiment of the invention, one support part undergoes movement and the other support part is maintained stationary to define an assembling desk. Further, the angle between the two support parts prior to movement is 95°; whereas, after the first movement the angle between the support parts is about 5°.

DESCRIPTION OF THE DRAWING

The foregoing and other aspects of the invention, various features thereof, as well as the invention itself, will be more fully understood from the following description when read together with the accompanying drawing, in which:

FIGS. 5a, 5b and 5c are schematic views similar to FIGS. 4a and 4b and illustrate the phases involved in the assembly of the two glass sheets.

DESCRIPTION OF THE PREFERRED EMBODIMENT

Figure 1:
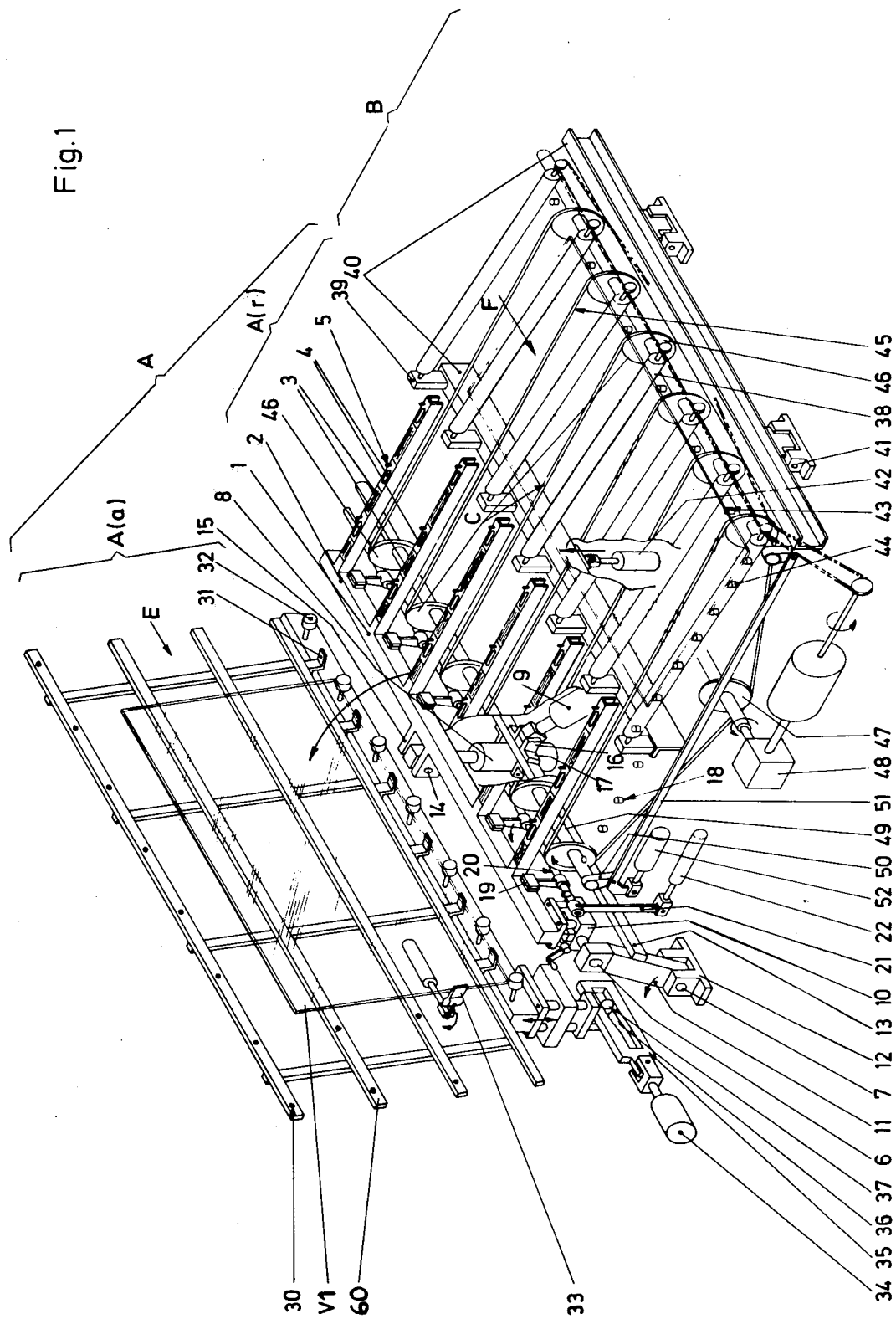
FIG. 1 is a view in perspective of the apparatus of the present invention in association with a pair of conveyor means for supplying glass sheets for assembly.

The apparatus of the present invention, referring particularly to FIG. 1, has a movable part and a stationary part. These parts have been referred to as "support parts." Both parts are adapted to receive a plate shaped object, such as a glass sheet, from separate conveyor assemblies. As will be brought out, the movable part functions to relocate one glass sheet through a compound pivotal movement around at least two axes to a second or assembly position at which a face of that glass sheet is presented in substantially parallel alignment to a face of the other glass sheet on the stationary part, the two glass sheets when assembled forming a double, insulating window. A collar will have been placed within the region of the periphery of the glass sheet before movement begins. The collar serves not only as a spacing member between the glass sheets but also as a seal thereby to trap a volume of air within the region circumscribed by the collar and between the glass sheets. Windows of this type are capable of forming an insulation barrier.

While the movable part will be described with regard to its capability of relocating a glass sheet from generally a horizontal plane to an assembly position by pivotal movement through an angle of 95°, the movable part according to the invention, also, could relocate the glass sheet by pivotal movement through a greater angle of up to 180°. In each case, however, it is essential that the pivotal movement in relocating the glass sheet or sheets be a compound pivotal movement around at least two axes. This essential characteristic of movement around different axes and the fact that more than the single glass sheet may be moved, will be more fully described below.

In the preferred embodiment, the apparatus is indicated by the brace A with the movable part and stationary part enclosed by the braces A(r) and A(a), respectively. The movable part A(r) has the capability, once it receives a glass sheet from the roller conveyor table B and belt transfer conveyor C, of "grippingly" supporting the glass sheet during movement to the assembly position. Means are provided for adjusting the height of the movable part relative to a frame (not shown) in accordance with and as a function of the thickness of glass sheet conveyed to it, and additional means are provided for referencing the glass sheet on the movable part.

Referring particularly to FIG. 1, the movable part A(r) includes a member 1 formed by a bar 2, a plurality of arms 3 and structure for pivotally mounting the member. The arms extend as a coextensive, equidistantly spaced apart parallel family from one side of the bar and may take the form of U-shaped channel members. As may be seen in the figure, the upper surface of the arms which supports the glass sheet is formed by the base of the channel. A plurality of cutouts of any particular shape as may be convenient are formed along each arm at similarly spaced locations. A disc 4 is received by each cutout. The discs have an opening connected by a conduit (not shown) to a source of pressure for creating a vacuum condition at the opening to "grip" the glass sheet so that the glass sheet undergoes pivotal movement with the member 1. The disc 4 may be seen to advantage in FIGS. 5a and 5c. A feeler 5 is located adjacent each of the discs and when it senses the presence of a glass sheet on member 1 serves to open communication between the opening in the disc and the pressure source. The feelers may be depressible buttons or the like connected to a valve or any other equivalent or well known structure for accomplishing the aforementioned purpose.

Figure 2:
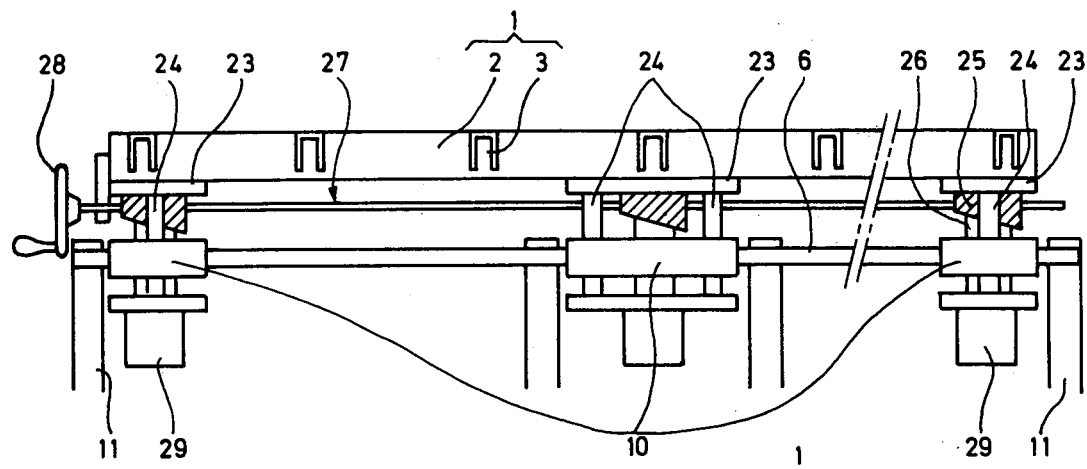
FIG. 2 is a partial view in front elevation of the apparatus of FIG. 1, with structure removed for clarity.
Figure 4A:
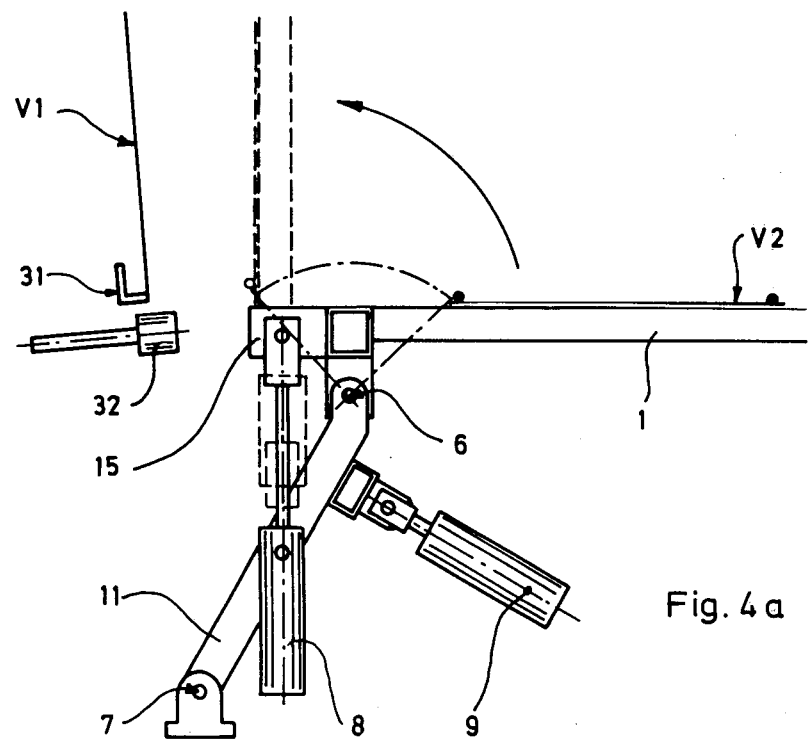
FIG. 4a and 4b are schematic views and illustrate a sequence of operative phases in the relocation of one glass sheet to an assembly point for assembly with a second glass sheet.
Figure 4B:
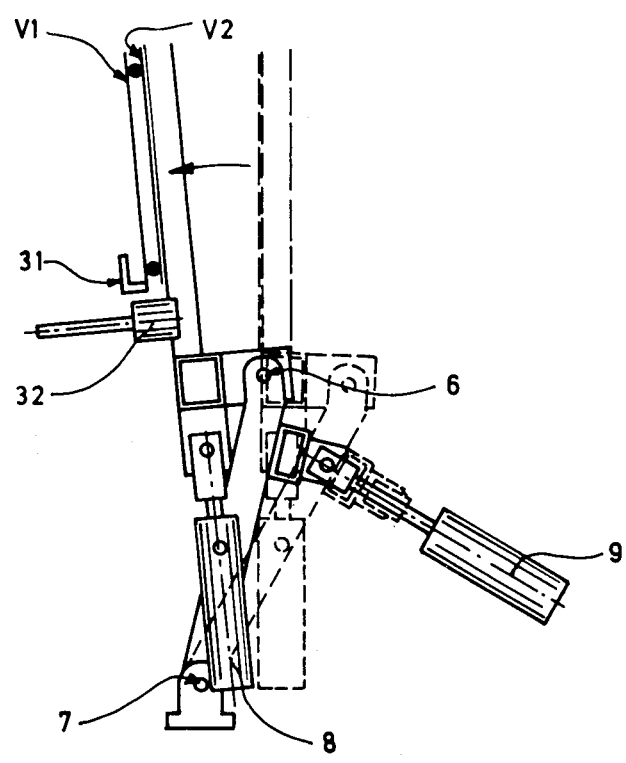

With continued reference to FIG. 1, as well as to FIGS. 4a and 4b, the structure for pivoting the member 1 includes a pair of cylinders 8 and 9 for pivoting the member about a pair of axes so that the member undergoes compound rotation first through an angle of approximately 90° about one axis and then through a further angle about a second axis. More particularly, the structure for mounting and pivoting the member comprises a number of structural components, which for the most part are on opposite sides of the member (see FIG. 2) yet illustrated only to the left side of the member in FIG. 1 for clarity of illustration. To this end, a pair of bearing blocks 10 support opposite ends of bar 2. At least one and preferably a plurality of bearing blocks 10 (see FIG. 2) are disposed between the end bearing blocks providing additional support for the bar. Each of the bearing blocks is formed with a central cutout and a shaft 6 is received therethrough. An arm 11 is disposed at opposite sides of the member and the shaft 6 is supported by the arms whereby both the shaft and member or the member relative to the shaft are capable of pivotal movement. A cap 12 in the form of a pair of spaced apart walls extending from a base which is secured by any suitable means to a frame (not shown) support the arms. A stub shaft 7 received between the spaced apart walls provides this function. A cross piece 13 is carried by each arm 11 between its ends so that the arms on opposite sides of member 1 undergo conjoint movement.

The shaft 7 describes one axis of movement of member 1, while the shaft 6 describes a second axis of movement of the member.

The cylinders 8 and 9 or any equivalent form of motion imparting means are connected to the member and pivoting means, respectively, by a rod extending from and movable relative to the cylinders. Each rod is connected to a cap 15 and 17, respectively, of a form like that of cap 12. The connection is accomplished by stub shafts 14 and 16, respectively. As may be seen in FIG. 1, the cap 15 extends from bar 2 in a direction opposite from the direction of the extending arms 2 while the cap 17 is carried by cross piece 13, preferably in a central location. Both of these caps may be an integral component of the structure with which they are associated, or else they may be a separate component and supported by that structure. A further cap is carried by the cross piece 13 in the location of cap 17 although on the opposite side. This cap, also defined by a pair of spaced apart walls, provides support for cylinder 8 therebetween.

The cylinder 9 is supported immovably by the frame by structure (not shown).

Figure 3A:
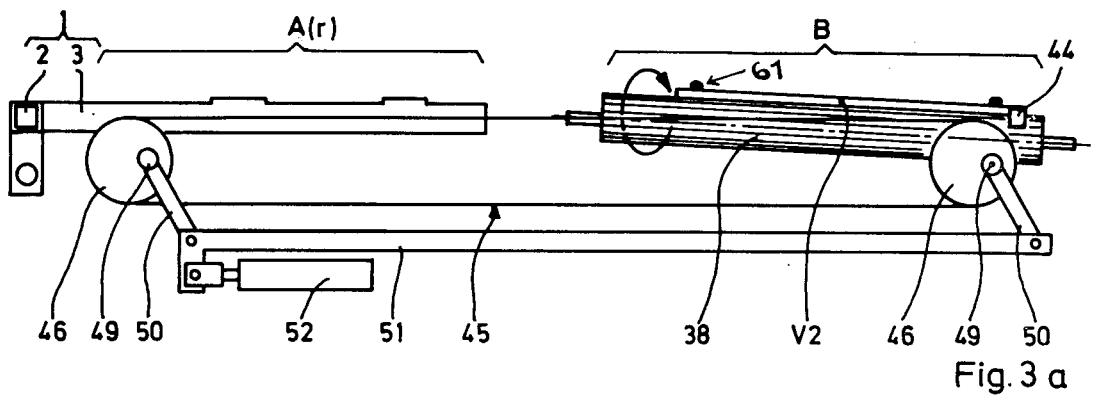
FIGS. 3a, 3b, 3c and 3d are schematic views and illustrate a sequence of operation in the transfer of a glass sheet from one conveyor means to the movable support part.
Figure 3B:
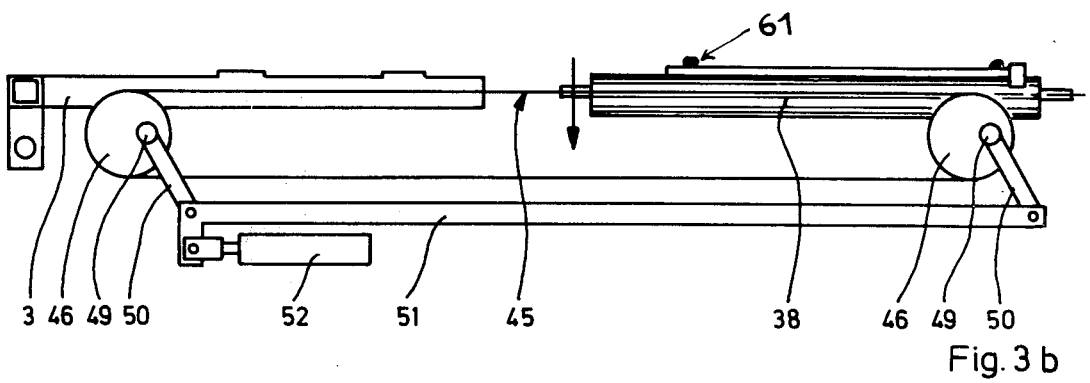
Figure 3C:
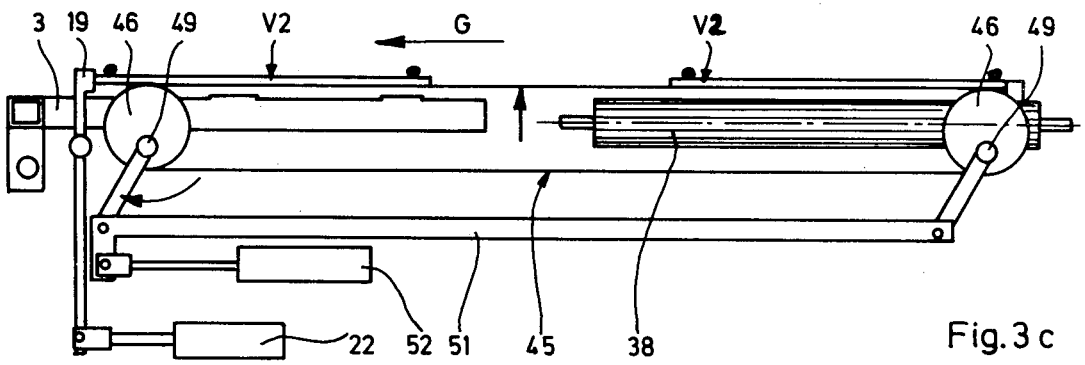
Figure 3D:
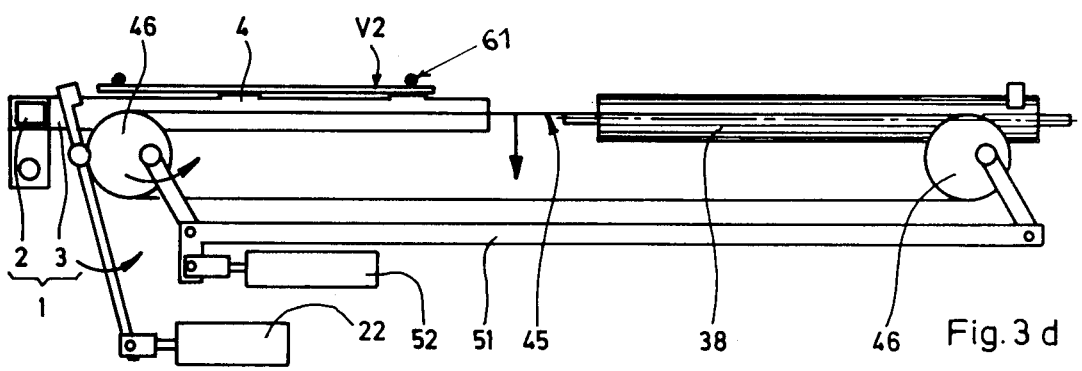

With reference still to FIG. 1, the means for referencing the position of the glass sheet on the member 1 comprises a plurality of rollers 18 disposed laterally of the leftmost arm 3. The rollers are arranged parallel to the arm and in alignment with a further plurality of referencing rollers to be described below. The referencing means also includes a plurality of thrust bearings 19 located adjacent to the junction of each arm 3 and bar 2. The thrust bearings are movable between the position in the figure and a retracted position through pivotal movement as seen in FIG. 3d. To this end, each thrust bearing is carried by a rod 20 extending across the member in parallel alignment with the bar 2 and supported at opposite ends by means (not shown). A rod 21 comprising a connecting rod, in turn, is connected to a cylinder rod to which movement is imparted by the cylinder 22.

Figure 2A:
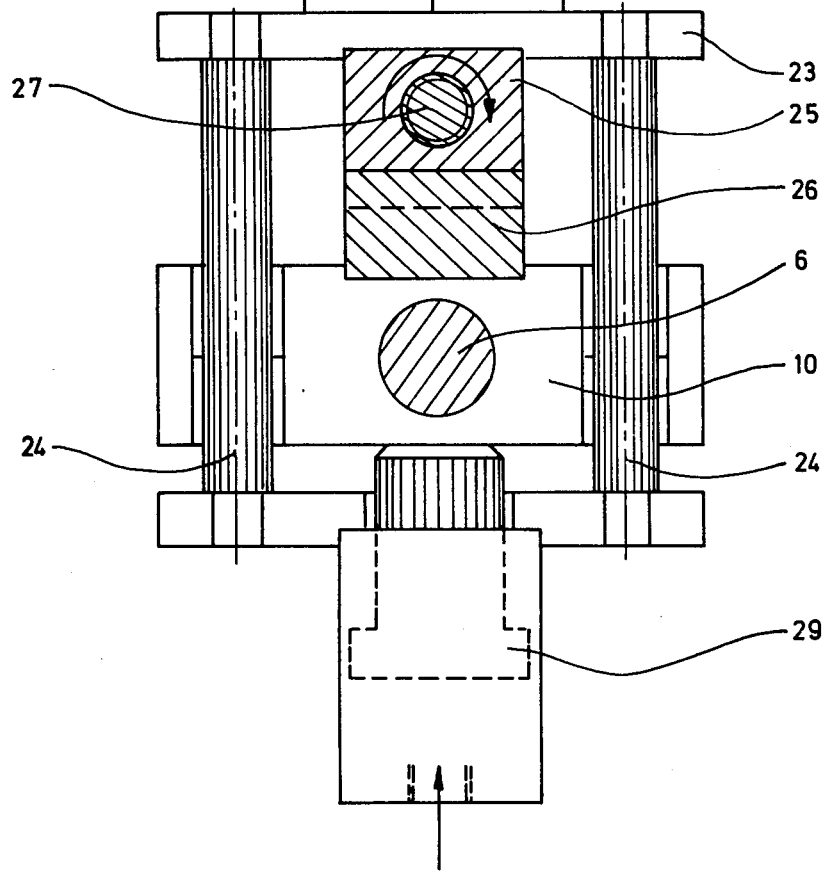
FIG. 2a is a side elevational view, partly in section, of the apparatus of FIG. 2.

The movable part (A) (r) is capable of adjustment in a vertical direction for receiving various thicknesses of glass sheet. If the glass sheet is thicker than a standard, the movable part is lowered and vice versa. The particular structure for carrying out this adjustment may best be seen in FIGS. 2 and 2a. To this end there is provided a platform 23 comprising a pair of plates spaced apart by a plurality of columns 24 arranged either along a line of symmetry of the platform or provided in a rectangular array such that a column may support the plates in the vicinity of each of the corners. The upper plate of the platform 23 supports the bar 2 at the location of each bearing block. A set of two superposed wedges 25 and 26 are disposed between the upper plate of platform 23 and bearing block 10. The wedges are juxtaposed along their beveled sides and through the action of a threaded rod 27, driven by crank 28, slide on these sides with the result that a variation in the distance between the axis of shaft 6 and member 1 may be achieved. A locking jack 29 supported by structure (not shown) maintains the adjusted orientation of the wedges.

The stationary part (A) (a) comprising an assembling desk is formed by a frame 60 characterized by a lattice network including a plurality of spaced-apart horizontal members and a plurality of spaced-apart vertical members. As in the illustration of FIG. 1, the vertical members are to the rear of the horizontal members. In the embodiment of the present invention, the frame is inclined at an obtuse angle from the plane of the movable part A(r). The angle may be approximately 95° and it may be as much as 180° thereby to situate the assembling desk in a horizontal attitude. A plurality of rollers 30 which either may be spherical or cylindrical are supported by the horizontal members of the lattice of the frame 60 thereby to assist in the movement therealong of a glass sheet V1 in the direction illustrated by the arrow E. A further plurality of rollers 32 in the form of cylindrical bearings are supported by a lower frame supporting member and it is upon these rollers that the glass sheet moves in the direction heretofore set out. Movement, under control of means (not shown) will continue until the glass sheet abuts a bearing 33 acting as a stop. At a later stage in the overall process of assembling a glass sheet V2 to the glass sheet V1 to fabricate a multiple, insulating window the bearing is retracted thereby to allow the multiple insulating window to continue its movement in the direction from which the glass sheet V1 moved and then it returns to the position of FIG. 1. During the processing of glass sheets V1 the lower frame supporting member is imparted movement in a vertical direction relative to frame 60 through the interaction of a cam shaped groove 36 in a drawer 35 and a pin 37. Thus, in a manner as is illustrated in the schematic presentation of FIGS. 5a, 5b and 5c, although not particularly set out in those figures the rollers 32 first are in an upper attitude so that their upper generatrix is above a level of a plurality of wedges 31 carried in spaced relation along the lower horizontal member of frame 60 and thereafter lowered to a lower position such that the glass sheet theretofore supported by the surface of the rollers henceforth will be supported on the wedges 31.

The second glass sheet V2 to be moved by the device of the present invention into juxtaposition with the glass sheet V1 supported by the assembling desk is supplied by a conveyor table B illustrated in FIG. 1 and in FIGS. 3a, 3b, 3c and 3d. The latter figures are illustrative of the interaction between the conveyor table B and the movable part A(r) which previously has been described.

The conveyor table B is formed by a frame 40 including a pair of spaced apart members which may be in the form of U-shaped channels. A plurality of bearing blocks 39 are supported along each of the channels (only one plurality is shown) thereby to support opposite ends of a shaft which supports a roller 38. As may be seen in FIG. 1, the portion of the shaft extending toward the frame 40 (the lower frame in the figure) supports a pulley wheel which through the action of a pulley belt imparts rotational movement to the several rollers (see FIG. 3a) whereby glass sheet V2 may be advanced in the direction of arrow F. The conveyor table B is capable of movement to a position of incline within the range of a few degrees with respect to the horizontal plane. To this end, one of the frame members is supported for pivotal movement about the axis of stub shaft 41 carried by each of a plurality of caps whose structure is as described. A cylinder 42 through its rod acts on the other frame member. Preferably, the caps will be equidistantly spaced apart along one frame member and the cylinder will act on the middle of the other frame member to prevent any torque being introduced in movement.

A first plurality of rollers 43 disposed in the vicinity of the lower frame member 40, defined above, and a second plurality of rollers 44 arranged perpendicular to the first and in the vicinity of the roller 38 (furthest downstream in the direction F) function to provide a reference for the glass sheet V2 on the conveyor table B. These reference means, at the second plurality, act with the reference means, i.e., the rollers 18 on member 1.

The belt transfer conveyor C as may be seen in FIG. 1 and FIGS. 3a, 3b, 3c and 3d takes up a position between the rollers 38 of roller conveyor table B and arms 3 of member 1. The conveyor C comprises a plurality of endless belts 45 carried by pulleys 46 which are spaced apart whereby one pulley is in the region of bar 2 and the other pulley is in the region of lower frame member 40. A pulley 47 is carried by the output shaft motor 48 and driven in a counterclockwise direction thereby to drive the belts in a similar direction for movement of glass sheet V2 from the roller conveyor table B to the movable part A(r). The pulley wheel mounted on each shaft of rollers 38 likewise are driven by motor 48.

The pulleys 46 are eccentrically mounted on shafts 49 carried by arms 50 which, in turn, are connected by rod 51 for conjoint movement. A cylinder 52 may be activated thereby to cause the rod 51 to translate from the position of FIG. 3a to the position of FIG. 3c and consequently to cause the belt transfer conveyor C to undergo movement in a vertical direction illustrated by the arrow in the latter figure.

The operation of the apparatus according to the present invention now will be described with reference to all of the figures of drawing.

A glass sheet V1 is conveyed by suitable means (not shown) substantially in a vertical orientation for supported disposition on frame 60 of the stationary part or assembling desk A(a). The direction of movement is indicated by arrow F. The manner of conveyance once the glass sheet V1 arrives at the region of frame 60 is through rotation of rollers 32. The glass sheet V1 will advance along the frame to a position of stop at the bearing 33. During this movement, the plurality of rollers will be in a position such that their upper generatrix is above the level of the surface of wedges 31. The distance between the upper surface of the wedges and the upper generatrix of the rollers may be approximately 5 mm. Thereafter, the rollers 32 are retracted to a position, such as is illustrated in FIG. 5a, through movement of drawer 35 to the left in FIG. 1. The movement of the rollers may be through a distance of 10–15 mm, for example. Thus the glass sheet V1 thereafter will be supported on the plurality of wedges 31 and remain in a stationary position at the bearing 33. The wedges and bearing reference the position of the glass sheet V1. During this time a second glass sheet V2 is undergoing conveyance to the roller conveying table B in a direction of movement illustrated by the arrow F. During movement to the roller conveyor table a collar 61 is disposed on the glass sheet V2, which collar will ultimately be intercalated between the glass sheets V1 and V2 when the latter is moved into juxtaposition with the former on the assembling desk A(a). At this time the roller conveying table B is inclined with respect to the horizontal through an angle of a few degrees, for example, 2°, as the glass sheet V2 advances through movement of the rollers 38. The glass sheet will advance to the position of rollers 44. Thereafter, the roller conveyor table B moves to a horizontal position (FIG. 3b) through the action of cylinder 42 and belt transfer conveyor C under action of cylinder 52, connecting rod 51 and arms 50 is moved to the upper position (FIG. 3c). In this position the belts 45 support the glass sheet V2 above the pulleys 38 and upon activation of motor 48 the glass sheet V2 is transferred to the member 1 of movable part A(r). This movement is illustrated by the arrow G in FIG. 3c. The glass sheet V2 is guided first by the rollers 44 and then by the rollers 18 throughout the distance of movement from the roller conveyor table B to the stop represented by thrust bearing 19. Thereafter, the belt transfer conveyor C is retracted to the position of FIG. 3d such that the glass sheet V2 is supported on the several discs 4 carried along the arm 3. As previously indicated, the feelers 5 communicate the opening in the discs to a source of vacuum so that the glass sheet V2 is firmly "gripped." The thrust bearing 19 may be retracted through the action of cylinder 22 (see FIG. 3d).

At this point the movable part A(r) is caused to undergo a pivoting movement thereby to dispose the glass sheet V2 carrying the collar 61 into a position adjacent glass sheet V1 supported by stationary part A(a). The particular movement which the movable part A(r) undergoes may be seen in the schematic presentation of FIGS. 4a and 4b as well as FIGS. 5a, 5b and 5c. To this end, the cylinder 8 first is activated to cause the member to undergo movement about the axis of shaft 6 from the solid line position to the dotted line position in FIG. 4a. The member will have pivoted through an angle of approximately 90°. As has been discussed, the cylinder 8 is connected to cap 15 which either may be integral or a part of the bar 3 through the connection provided by stubshaft 14. Thereafter, the cylinder 9 is activated and drives these components through a further pivotal movement of approximately 5° about the axis of shaft 7. This latter movement is illustrated in FIG. 4b and upon completion of the movement the glass sheet V2 will be in juxtaposition of the glass sheet V1 so that the collar 61 with only regular deformation therearound will thereafter be intercalated between the two glass sheets of the multiple, insulating window. The air trapped therebetween will provide athermal barrier.

When the member 1 is pivoted through the first angle of 90° a detector (not shown) which may be in the form of an electric eye or the equivalent is activated thereby first to deactivate the cylinder 8 and thereafter to activate the cylinder 9. The member 1 then is pivoted through a second angle of 5° in the preferred embodiment along a much greater radius which is increased approximately by the length of arm 11. Because of movement of glass sheet V2 through the greater radius it arrives at the assembling desk in substantial parallelism with glass sheet V1. In the present embodiment the length of arm 11 may be approximately 60 cm.

Turning now to FIGS. 5a, 5b, and 5c, it will be evident that the movable part A(r) once it moves the glass sheet V2 into juxtaposition with the glass sheet V1 actuates an end of stroke mechanism which serves several functions, namely to close the communication of the source of pressure to the opening in disc 4, to trigger a backward or reverse pivotal movement of the movable part A(r), to actuate the rollers 32 to a position such that their upper generatrix (see FIG. 5b) is at a level to support the glass sheets V1 and V2 and thereafter by means (not shown) to actuate cylinder 34 to cause the drawer 35 to move to the right in FIG. 1. Movement of the drawer to the right results in the rollers moving upward to the position of FIG. 5c, about 5 mm., so that both of the glass sheets V1 and V2 forming the multiple, insulating window may be moved further in the direction of arrow E to a downstream work station. The bearing 33 will have retracted and the movable part A(r) will return to the position of FIG. 1 thereby to await a further glass sheet V2 for initiation of the aforementioned processing.

The apparatus of the present invention may be used to form multiple, insulating windows utilizing glass sheets of any thickness because of the adjusting means. And while the pivoting of glass sheet B2 has been described as undergoing movement through a total angle of 95° decomposed ito a first pivotal movement through an angle of 90° and, then through an angle of 5°, it was noted and is noted again that the particular angles of movement may be different. If desired, the total angle of movement may be up to 180°. It is an essential point of the present invention that the pivotal movement be a compound movement carried out above several axes. In the case of two axes the movement may be carried out in two stages: the first movement through a large angle around an axis located in the immediate vicinity of the glass sheet so as to reduce as best as possible the space required for that movement; and the second movement through a small angle around a second axis offset as far as possible from the glass sheet. The axis of the second movement is located substantially at the intersection of the plane of the face of the stationary glass sheet V1 on the assembling desk and of the plane of the face of the glass sheet V2 after having undergone the first movement described, i.e., in a position of about 90° from a horizontal position. In order to limit as much as possible the space required for the overall operation, it is desirable to effect the greatest part of the total movement around an axis located very near the glass sheet with the smallest part of the total movement around an axis offset as far as possible from the glass sheet and thereby around a much larger radius.

The apparatus of the present invention has been described in relationship to the assembly of a multiple insulating window in which a single glass sheet is moved relative to another glass sheet which remains stationary. However, without departing from the spirit and scope of the invention it is possible to provide an apparatus in which both glass sheets are moved towards each other with each glass sheet undergoing a compound rotation around different axes. Thus, each of the two glass sheets to be assembled will be placed on a member 1 of movable part A(r) and each member will effect the greatest part of its movement around the axis of a shaft, such as a shaft 6, located very near the glass sheet which it supports and then two members will bring the two glass sheets V1 and V2 into contact as a result of one glass sheet being moved toward the other through a small angle around a common axis of a shaft, such as shaft 7, located at the intersection of the planes of the faces of the two glass sheets V1 and V2 after they have undergone movement around shaft 6. The two members 1 of the movable part A(r) will include structure as heretofore set out to provide the functions described and each movable part A(r) will be associated with a roller conveyor table B and a belt transfer conveyor C, also as described in structure and function.

The movement which the movable part of parts A(r) undergoes, i.e., the compound pivotal movement, first about an axis located near the movable part and, then, about an axis located further from the movable part may be considered as a "fold back" movement.

While the invention has been described in connection with the preferred embodiments, it is not intended to limit the invention to the particular form set forth, but, on the contrary, it is intended to cover such alternatives, modifications, and equivalents as may be included within the spirit and scope of the invention as defined by the appended claims.

What is claimed is:

1. Apparatus for moving plate shaped objects such as glass sheets into juxtaposition comprising a support for each of the plate shaped objects, at least one of said supports being pivotally mounted for fold back movement around at least two axes located near the glass sheet which it supports, each said axis being simultaneously parallel to the other and to the planes of the two supports, and said axes being unequally spaced from the support undergoing fold back movement.

2. The apparatus according to claim 1 including a pair of bearing blocks mounted on said support undergoing fold back movement, wherein the first of said axes passes through said stationary bearing blocks directly on said support, and wherein the second of said axes is disposed at a position distant from said bearing blocks and said first axis at the end of two arms carrying the first axis at their other end part, cylinder means attached to the support undergoing folded back movement in order to drive it into rotation around the two axes.

3. Apparatus according to claim 2 characterized in that it comprises two cylinder means driving the support into rotation in succession around the first axis and then the second; a first cylinder means fastened on the one hand directly to the support which may be folded back and, on the other hand, to a cross-piece connecting the two arms; a second cylinder means fastened, on the one hand, to the cross-piece and, on the other hand, to frame means, a stop detector for the first cylinder means and go detector for the second cylinder means being placed in front of the support which may be folded back in the position which it occupies after a first folding back around the first axis under the action of the first cylinder means.

4. Apparatus according to claim 3 characterized in that the second axis around which is effected the second part of the folding back operation under the effect of the second cylinder means is the most distant and is located at the intersection of the two planes in which are located the two supports at the end of the first folding back operation.

5. Apparatus according to claim 4 characterized in that a support which may be folded back is provided with adjustment means as a function of the thickness of the objects to be assembled, with maintaining means and means for setting said plate shaped objects as a reference.

6. Apparatus according to claim 5 characterized in that the adjustment means as a function of the thickness of the plate shaped objects to be assembled are intercalated between, on the one hand, bearing blocks supporting the axis located nearest the support which may be folded back and around which is effected the first part of the folding back operation and, on the other hand, said support which may be folded back and consists of platforms which are movable upwards with respect to the bearing blocks, along guiding slides under the action of sets of two superposed bevelled wedges with their surfaces inclined in contact and which may be staggered the one with respect to the other.

7. Apparatus according to claim 5 characterized in that the means for maintaining the objects are discs supported by the support and adapted to be connected to a pressure source which may be folded back and connected by a trigger action of a plurality of feelers actuated by the plate shaped object to be folded back.

8. Apparatus according to claim 5 characterized in that the means for setting as a reference consist of two perpendicular rows of guide marks which border the support which may be folded back, comprising, on the one hand, a row of retractable thrust bearings parallel to the axis of the rotation and, on the other hand, a row of rollers.

9. Apparatus according to claim 1 characterized in that only one support pivots and in that the other one consists of a stationary assembling desk provided with wedges designed to support the plate shaped object and with a thrust-bearing for setting said object as a reference.

10. Apparatus according to claim 9 characterized in that the two components, i.e., the support which may be folded back and the stationary support or assembling desk, form a 95° angle when they are in a resting position.

11. Apparatus according to claim 10 characterized in that the two components are at 5° after the first folding back effected around the first axis located in the vicinity of the movable support.

* * * * *